(12) United States Patent
Takahashi

(10) Patent No.: US 6,729,447 B2
(45) Date of Patent: May 4, 2004

(54) ROTATIONAL SPEED CONTROLLER

(75) Inventor: Kenji Takahashi, Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 0 days.

(21) Appl. No.: 10/272,806

(22) Filed: Oct. 17, 2002

(65) Prior Publication Data

US 2003/0075404 A1 Apr. 24, 2003

(30) Foreign Application Priority Data

Oct. 23, 2001 (JP) ........................................ 2001-325011

(51) Int. Cl.⁷ ............................................... F16D 57/02
(52) U.S. Cl. ..................... 188/291; 188/293; 188/82.77
(58) Field of Search ........................... 188/82.1, 82.77, 188/290, 291, 292, 293, 294, 295, 296

(56) References Cited

U.S. PATENT DOCUMENTS

| | | | | |
|---|---|---|---|---|
| 4,241,814 A | * | 12/1980 | Masclet | 188/266 |
| 4,352,304 A | * | 10/1982 | Warner | 74/498 |
| 4,497,393 A | * | 2/1985 | Brems | 188/322.5 |
| 4,550,471 A | * | 11/1985 | Beckman et al. | 452/33 |
| 4,694,530 A | * | 9/1987 | Foggini | 16/82 |
| 5,170,867 A | * | 12/1992 | Ojima et al. | 188/291 |
| 5,269,397 A | * | 12/1993 | Kawamoto et al. | 188/290 |
| 5,335,563 A | * | 8/1994 | Yamamoto et al. | 74/512 |
| 5,381,877 A | * | 1/1995 | Kobayashi | 188/290 |
| 5,522,485 A | * | 6/1996 | Takahashi et al. | 188/306 |
| 5,769,188 A | * | 6/1998 | Okabe et al. | 188/82.84 |
| 6,085,384 A | * | 7/2000 | Bivens | 16/54 |
| 6,155,328 A | * | 12/2000 | Welfonder | 160/313 |

FOREIGN PATENT DOCUMENTS

EP 540298 * 5/1993

* cited by examiner

*Primary Examiner*—Jack Lavinder
*Assistant Examiner*—Devon Kramer
(74) *Attorney, Agent, or Firm*—Steinberg & Raskin, P.C.

(57) ABSTRACT

The provision of a rotational speed controller which is capable of increasing braking torque without a corresponding increase in size, and easily outputting braking torque assumed in the design, and minimizing variations in the braking torque. A casing 6 incorporates a shaft 7 inserted therein, a first rotor 8 rotated together with the shaft 7 in one piece, and a second rotor 10 rotated through the medium of the first rotor 8 and a planet gear 9. A first rotation mechanism for rotating the first rotor 8 is the shaft 7. A second rotation mechanism for rotating the second rotor 10 is a planetary gear mechanism operated in association with the rotation of the first rotor 8.

6 Claims, 6 Drawing Sheets

ROTATIONAL SPEED CONTROLLER

BACKGROUND OF THE INVENTION

1. Field of the Invention

This invention relates to a rotational speed controller such as an endless rotation damper and the like.

2. Description of Related Art

A roller blind mounted on a window, for example, incorporates a torsion spring having a turning force acting in the winding-up direction of the roller blind. When winding the roller blind down, a rotation braking mechanism of the torsion spring prevents the blind from being wound up. On the other hand, when winding up the roller blind, the rotation braking mechanism is disengaged to allow the torsion spring to automatically wind up the blind.

When the roller blind is wound up as described above, a winding force is accelerated and therefore the roller blind may be rolled up quickly and sharply. If the blind is rolled up quickly in this way, a stopper provided at the lower hem of the blind hits a winding shaft with a loud noise, and in some cases, the stopper itself or the winding shaft may be broken.

Therefore, a rotational speed controller such as an endless rotation damper or the like is used for slowly rolling up the roller blind. The conventional endless rotation damper is designed as follows.

A shaft is rotatably supported in a casing, and fitted with a rotor rotating together with the shaft in one piece. The casing fitted with the shaft and the rotor is filled with a viscous fluid, and sealed with a cap. Inside the casing fitted with the shaft and the rotor and sealed with the cap, a fixed clearance is formed between the outer periphery of the rotor and the inner periphery of the casing and filled with the viscous fluid.

In the above construction, upon rotation of the shaft, the rotor is rotated in relation to the casing. Upon the rotation of the rotor in relation to the casing, the viscous substance provided between the rotor and the casing has shearing resistance. The shearing resistance provides braking torque on the rotating shaft to prevent the roller blind from being rolled up quickly.

In the above conventional endless rotation damper, if a high braking torque is required, there is no choice but to increase the rotational speed of the shaft. This is because a magnitude of the shearing resistance generated between the rotor and the casing is determined by the rotational speed of the shaft, in which the higher the rotational speed of the shaft is, the higher the shearing resistance which is generated between the rotor and the casing. Accordingly, when a higher braking torque is required, the rotational speed of the shaft is increased to increase the shearing resistance.

However, in the case of the above endless rotation damper, a rotational speed of the shaft is determined in accordance with the use thereof. In the endless rotation damper designed as described above it is impossible to increase its braking torque.

Therefore, one known endless rotation damper which is capable of developing a high braking torque without increasing the rotational speed of the shaft is described in Japanese Patent Laid-open No. 2-292480, of which the device is shown in FIG. 7 attached to the present application.

As shown in FIG. 7, a shaft 2 is held rotatably in a case 1. Inside the case 1, a plurality of stationary disks 4 is mounted in a direction orthogonal to the shaft 2. On the shaft 2 a plurality of movable disks 3 is mounted in a direction orthogonal to the shaft 2.

Each of the movable disks 3 is disposed between two stationary disks 4.

After the shaft 2 and the movable disks 3 are assembled in the case 1 provided with the stationary disks 4 as described above, the case 1 is filled with a viscous fluid 5 and sealed with a cap. The viscous fluid 5 is interposed between each stationary disk 4 and each movable disk 3.

In the above construction, upon rotation of the shaft 2, the movable disks 3 mounted on the shaft 2 are rotated in relation to the stationary disks 4. At this point, shearing resistance is generated between each movable disk 4 and each stationary disk 3. That is, the number of points at which the shearing resistance is generated is increased to increase the shearing resistance in the entire damper, thus providing a high braking torque.

In order to obtain a higher braking torque in the above conventional damper, it is needed to increase the number of stationary disks 4 or movable disks 3 or to increase a diameter of each disk. However, the length in the shaft direction is inevitably increased if the number of disks is increased, and likewise the size in the radial direction if the diameter of each disk is increased, resulting in an increase in size of the entire damper.

Therefore, there is a limit to the increase in the number of disks and the diameter of each disk. This limit leads to the problem of a limit to the production of a high braking torque.

Another problem is that the variation in the braking torque between the dampers is increased as the number of stationary disks 4 and movable disks 3 is increased.

For example, the more the number of stationary disks and, movable disks is increased, the more easily a dimension error in assembling is produced and the more easily a variation in spacing between the disks is produced. If the spacing between the disks varies, the shearing resistance which is dependent upon the spacing also varies, which creates another problem of there being a different braking torque even between dampers of the same specifications. Further, there is another problem that it is difficult to obtain the required torque assumed in the design process.

SUMMARY OF THE INVENTION

It is a first object of the present invention to provide a rotational speed controller which is capable of increasing baking torque without a corresponding increasing in size. It is a second object of the present invention to provide a rotational speed controller which is capable of easily outputting braking torque assumed in a design process, and minimizing variations in the braking torque.

The present invention provides a rotational speed controller according to a first feature which comprises a casing filled with a viscous fluid; a shaft rotating relatively to the casing; a first rotor incorporated in the casing; a second rotor rotating relatively to the first rotor with a gap between itself and the first rotor; a cap for hermetically sealing the casing; a first rotation mechanism for rotating the first rotor; and a second rotation mechanism for rotating the second rotor, shearing resistance being generated between the first rotor and the second rotor.

A second feature is that a gap is maintained between the inner periphery of the casing and the outer periphery of the first rotor, and shearing resistance is generated between the inner periphery of the casing and the outer periphery of the first rotor.

A third feature is that the first rotor and the second rotor are rotated in the opposite directions to each other.

A fourth feature is that the first rotor and the second rotor are rotated relatively by a planetary gear mechanism.

A fifth feature is that the first rotor and the second rotor are driven by a same driving source.

A sixth feature is that the first rotor and the second rotor are driven individually by separate driving sources.

According to the present invention, the rotational speed controller comprises: a casing filled with a viscous fluid; a shaft rotating relatively to the casing; a first rotor incorporated in the casing; a second rotor rotating relatively to the first rotor with a gap between itself and the first rotor; a cap for hermetically sealing the casing; a first rotation mechanism for rotating the first rotor; and a second rotation mechanism for rotating the second rotor, and is designed so as to generate shearing resistance between the first rotor and the second rotor. With the above design, the shearing resistance is generated on both the first rotor and the second rotor. The shearing resistance generated on both the first rotor and the second rotor is higher than that generated on either one of the rotors.

Because of the design capable of generating a high shearing resistance between the first rotor and the second rotor, there is no need to provide extra points for generating shearing resistance. Accordingly, it is possible to reduce the number of assembled members, and thereby decrease the amount of assembly error caused when the members are assembled. In turn, the decrease in the assembly error leads to a decrease in variations in the shearing resistance which are caused by the assembly error. The decrease in variations in the shearing resistance as described above makes it possible to reliably provide torque assumed in the design process.

In particular, according to the second feature, a gap is maintained between the inner periphery of the casing and the outer periphery of the first rotor, and shearing resistance is generated between the inner periphery of the casing and the outer periphery of the first rotor. Hence, the shearing resistance generated between the first rotor and the second rotor is added to by the shearing resistance generated between the first rotor and the casing, to act upon the shaft. Accordingly, a further higher shearing resistance is provided.

In particular, according to the third feature, the first rotor and the second rotor are rotated in the opposite directions to each other, so that the sharing resistance generated on each of the first rotor and the second rotor is further increased. In addition, the rotation of the first rotor and the second rotor in the opposite directions to each other provides braking torque for braking the rotation of the shaft.

In particular, according to the fourth feature, the first rotor and the second rotor are relatively rotated by a planetary gear mechanism. Hence, the first rotor and the second rotor are rotated in opposite directions at low cost and with high accuracy. In addition, the braking torque is adjusted by changing the gear ratio of the planetary gear mechanism, and a rotational speed controller with a high speed dependence is provided. When the gear ratio of the planetary gear mechanism is changed in this way, it is possible to provide braking torque in accordance with the use.

DETAILED DESCRIPTION OF THE PREFERRED EMBODIMENTS

Figure 1:
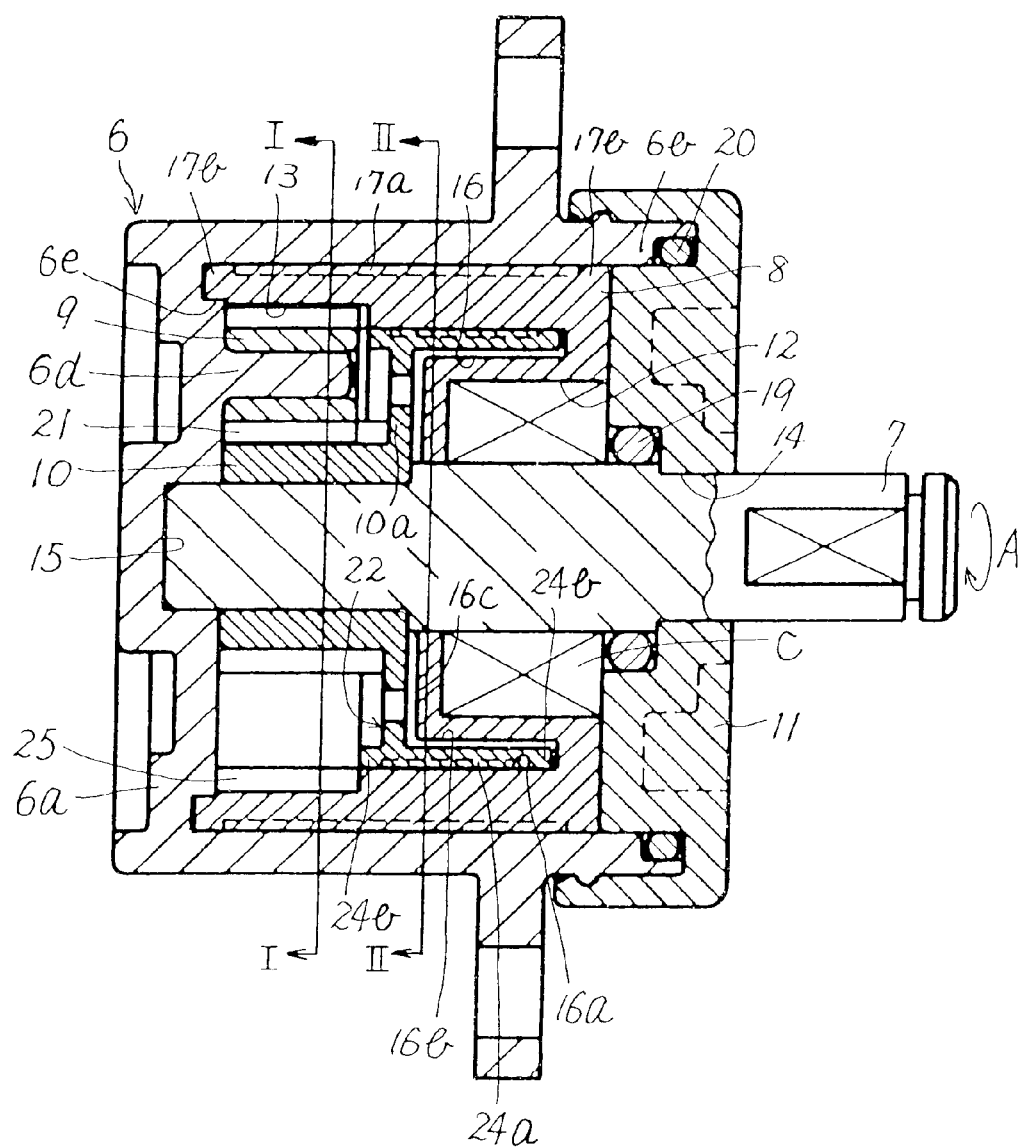
FIG. 1 is a sectional view of a first embodiment of an endless rotation damper according to the present invention.

FIG. 1 to FIG. 4 illustrate an endless rotation damper serving as a rotational speed controller according to a first embodiment of the present invention. In the first embodiment, a casing 6 has a shaft 7 inserted into, and incorporates a first rotor 8 rotating together with the shaft 7 in one piece, and a second rotor 10 rotated through the medium of the first rotor 8 and a planet gear 9. A first rotation mechanism for rotating the first rotor 8 is the shaft 7, and a second rotation mechanism for rotating the second rotor 10 is a planetary gear mechanism which operates in association with the rotation of the first rotor 8.

The first embodiment will be described hereinafter in detail.

As illustrated in FIG. 1, the tubular-shaped casing 6 has one end closed by an end wall 6a and the other end 6b open.

After the first rotor 8 has been installed in the above casing 6, a cap 11 is mounted on the casing 6 to close the open end 6b of the casing 6.

In turn, the rotor 8 has an end face on which a recess 12 for installing a clutch is formed, and the other end face on which a recess 13 for installing the second rotor is formed, and the shaft 7 passes through the centers of the recesses 12 and 13. The shaft 7 is supported rotatably on a bearing hole 14 formed in the cap 11 and a bearing hole 15 formed in the end wall 6a of the casing 6.

The rotor 8 is provided with a ring-shaped installing recess 16 formed in the bottom of the second-rotor installing recess 13 and around the shaft 7.

The first rotor 8 incorporated in the casing 6 in the above manner is rotatable in relation with the shaft 7, so that a rotating force of the shaft 7 is transferred to the first rotor 8 through a one-way clutch mechanism c installed into the clutch-installing recess 12. Specifically, the one-way clutch mechanism c is designed to transfer a rotating force of the shaft 7 to the first rotor 8 when the shaft 7 is rotated in one direction, but not to transfer a rotating force of the shaft 7 to the first rotor 8 when it is rotated in the other direction. Accordingly, the first rotor 8 rotates only in one direction.

It should be noted that the above one-way clutch mechanism c is well known and a detailed description is omitted.

Figure 2:
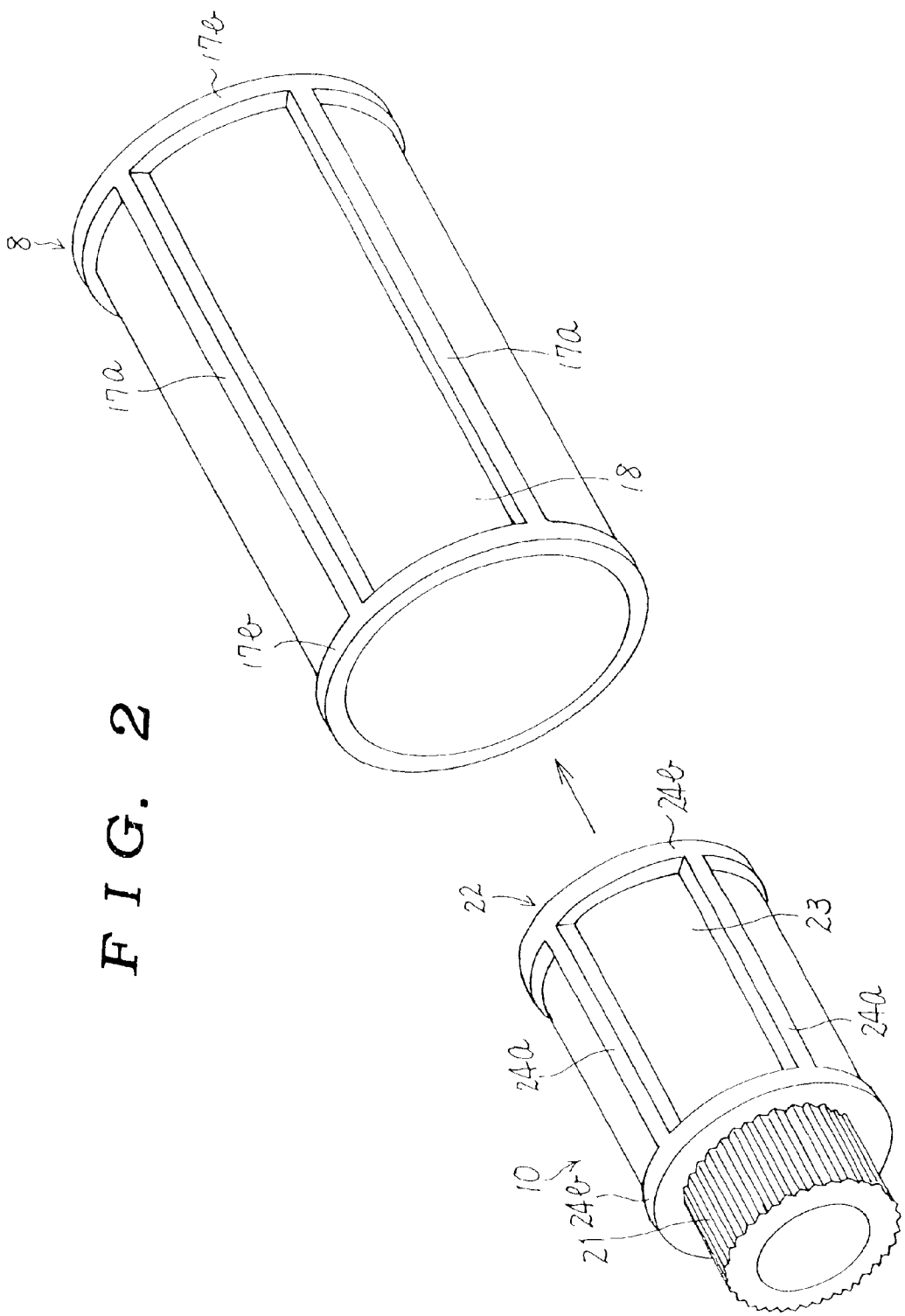
FIG. 2 is a perspective view of a first roller and a second roller.
Figure 3:
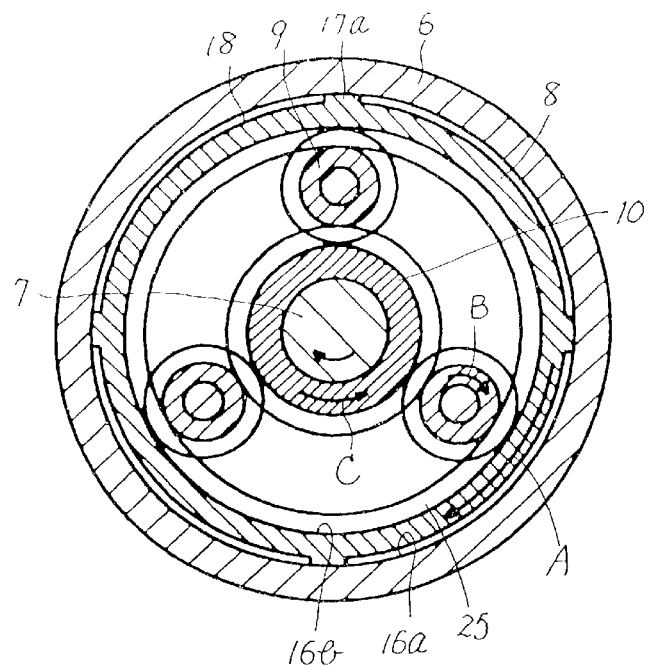
FIG. 3 is a sectional view taken along the I—I line in FIG. 1.

On the outer periphery of the first rotor 8 which rotates in the one direction in association with the rotation of the shaft 7 as described above, a plurality of fluid storing recesses 18 are formed by means of enclosure by jutting strips 17a extending in parallel to the axis and circumferential protrusions 17b extending in the circumferential direction as illustrated in FIGS. 2 and 3.

The first rotor 8 designed as described above is incorporated in the casing 6. The casing 6 includes a ring-shaped step 6e formed on the closed end 6a for rotatably supporting the leading end of the first rotor 8. The first rotor 8 is supported rotatably by the ring-shaped step 6e and the shaft 7 through the medium of the one-way clutch c.

By incorporating the first rotor 8 in the casing 6 as described above, the jutting strips 17a and the circumferential protrusions 17b are in close proximity to the inner periphery of the casing 6 and slide thereon.

Reference numeral 19 in FIG. 1 represents a sealer for sealing around the shaft 7 and reference numeral 20 represent a sealer for sealing the interface between the cap 11 and the casing 6.

The provision of the sealers 19 and 20 makes it possible to hermetically seal the casing 6 with the cap 11, creating a hermetically enclosed space which is filled with oil, which is a viscous fluid. The oil flows into the fluid-storing recesses 18 formed on the outer periphery of the first rotor 8.

The second rotor 10 is installed in the second-rotor installing recess 13 formed on the first rotor 8, and provided for relative rotation to the shaft 7.

A sun gear 21 is provided on the outer periphery of the second rotor 10. With the interposition of a rising portion 10a standing up from the outer side face of the second rotor 10, a cylindrical insertion 22 is formed on the face away from the sun gear 21. The insertion 22 is inserted into the ring-shaped installing recess 16, so that the outer periphery of the insertion 22 is in close proximity to one face 16a of the faces of the ring-shaped installing recess 16. To explain the nature of the one face 16a forming the recess 16, the recess 16 has a face 16b situated closer to the axis and a face 16a situated on the outer side further away than the face 16b, and "one face 16a" described here refers to this face situated on the outer side.

The ring-shaped installing recess 16 is provided with a face 16c formed at right angles to the other face 16b.

Figure 4:
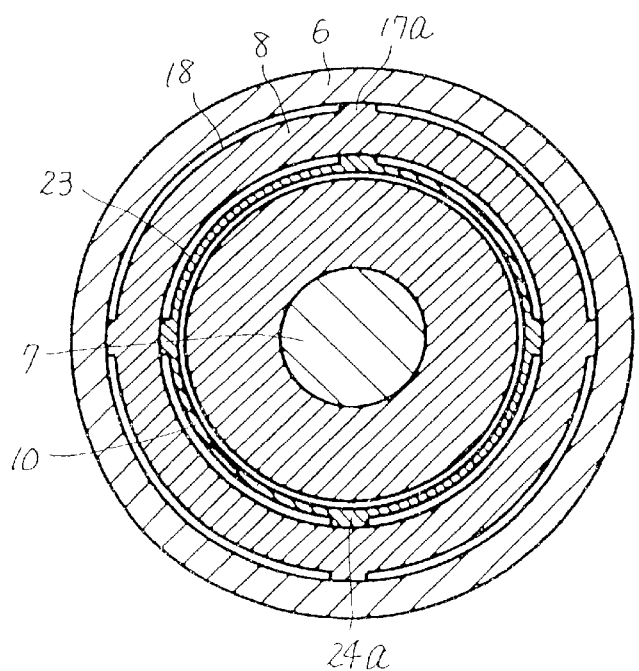
FIG. 4 is a sectional view taken along the II—II line in FIG. 1.

As illustrated in FIG. 4, the inner periphery of the cylindrical insertion 22 maintains a gap between itself and the other face 16b, and the rising portion 10a of the second rotor 10 maintains a gap between itself and the face 16c perpendicular to the other face 16b. The above gaps are filled with oil.

As illustrated in FIG. 2, on the outer periphery of the insertion 22, fluid storing recesses 23 are formed as in the case of the fluid storing recesses 18 formed on the first rotor 8. Specifically, on the outer periphery of the second rotor 10, a plurality of the fluid storing recesses 23 are formed by means of enclosure with jutting strips 24a extending in parallel to the axis and circumferential protrusions 24b extending in the circumferential direction.

Turning back to FIG. 1, the planet gear 9, which is installed in the second rotor installing recess 13, is mounted on a shaft 6d provided in the case 6, thereby allowing the planet gear 9 not to revolve but to freely rotate on its axis.

The planet gears 9 mounted as described above are engaged with the sun gear 21 and a ring gear 25 formed on the inner periphery of the second rotor installing recess 13.

Hence, as illustrated in FIG. 3, when the one-way clutch mechanism c is operated to rotate the first rotor 8 in association with the shaft 7 in the direction indicated by the arrow A, the planet gears 7 rotate in the direction indicated by the arrow B, whereupon the second rotor 10 rotates in the direction indicated by the arrow C which is opposite to the direction of the first rotor 8.

The planetary gear mechanism in the present invention comprises the sun gear 21, the planet gears 9 and the ring gear 25.

Next, the mode of operation in the first embodiment will be described.

The shaft 7 is linked to a predetermined power source and rotated in the direction of the arrow A as illustrated in FIGS. 1 and 3, whereupon the rotating force of the shaft 7 is transferred to the first rotor 8 through the one-way clutch mechanism c to also rotate the first rotor 8 in the direction of the arrow A.

When the first rotor 8 rotates in this way, the jutting strips 17a and the inner periphery of the casing 6 make a relative rotation to allow the fluid stored in each of the fluid storing recesses 18 to flow on the sliding face between the jutting strips 17a and the casing 6. The fluid flowing onto the sliding face between the jutting strips 17a and the casing 6 generates a high shearing resistance. The high shearing resistance acts in a direction of braking the rotation of the first rotor 8.

On the other hand, at the time when the first rotor 8 rotates and the rotating force of the rotor 8 is transferred to the second rotor 10 through the planetary gear mechanism, the jutting strips 24a of the second rotor 10 rotate in the direction opposite to the first rotor 8 while remaining in close proximity to the one face 16a of the ring-shaped installing recess 16. At this point, the oil stored in each of the fluid storing recesses 23 flows onto the sliding face between the jutting strip 24a and the one face 16a, to provide a high shearing resistance on the sliding face. The high shearing resistance works in a direction of braking the rotation of the first rotor 8. Due to the rotations of the first rotor 8 and the second rotor 10 being in the opposite directions to each other, the speed of the relative rotation of the rotors 8 and 9 is extremely high. The higher the relative rotation speed is, the higher the shearing resistance is, resulting in a further increased braking force.

Due to the rotation of the first rotor 8 and the second rotor 10 in the opposite directions to each other, shearing resistance is generated also by the oil fed into the gap between the inner periphery of the insertion 22 and the other face 16b of the ring-shaped installing recess 16, and the oil fed into the gap between the rising portion 10a of the second rotor 10 and the aforementioned face 16c.

According to the first embodiment, a braking force caused by a high shearing resistance of the oil on the jutting strips 17a formed on the first rotor 8 is added to a braking force caused by a higher shearing resistance of the oil on the jutting strips 24a formed on the second rotor 10, and the resulting combined braking force acts upon the first rotor 8. This combined braking force is further added to by a braking force caused by a shearing resistance generated on the inner periphery of the insertion 22 of the second rotor 10.

In this way, the braking force produced by the jutting strips 17a, that produced by the jutting strips 24a, and that produced by the inner periphery of the insertion 22 are added together and act upon the first rotor 8, resulting in a greatly increased braking force acting upon the first rotor 8.

As described above, the planetary gear mechanism generates the rotation of the first rotor 8 and the second rotor 10 in the opposite directions, leading to a higher speed dependence of the shearing resistance than that in the prior art. That is, when a rotational speed of a shaft is increased in a device in the prior art, the shearing resistance is increased at a low ratio in proportion to the increase in the rotational speed. Specifically, when the rotational speed of the shaft is increased by 10 rpm, the shearing resistance between the stationary disk and the movable disk is increased only by an amount corresponding to 10 rpm.

However, in the first embodiment, when the rotational speed of the shaft 7 is increased by 10 rpm, the shearing resistance generated corresponds to 30 rpm. This will be explained by taking the case of a gear ratio of 2 between the sun gear 21 and the ring gear 25 as an example.

When the rotational speed of the first rotor 8 linked to the shaft 7 is 10 rpm, the second rotor 10 has a rotational speed of 20 rpm because of the gear ratio of 2. At this point, since the first rotor 8 is rotated in the direction opposite to the rotation of the second rotor 10, a relative speed between the rotors 8 and 10 results in the addition of the rotational speed 10 rpm of the first rotor 8 to the rotational speed 20 rpm of the second rotor 10. Accordingly, the relative speed of the first rotor 8 and second rotor 10 is 30 rpm.

If the rotational speed of the first rotor 8 is increased by 10 rpm, from 10 rpm to 20 rpm, the rotational speed of the second rotor 10 is increased to 40 rpm. At this point, the relative speed of the first rotor 8 and second rotor 10 is 20 rpm plus 40 rpm, resulting in 60 rpm.

In other words, in the first embodiment, when the rotational speed of the first rotor 8 is increased from 10 rpm to 20 rpm, the relative speed between the first rotor 8 and the second rotor 10 is increased by 30 rpm, from 30 rpm to 60 rpm. In this way, an increase in the rotational speed of the first rotor 8 linked with the shaft 7 greatly affects the increase in relative speed between the first rotor 8 and the second rotor 10, resulting in a high speed dependency.

The speed dependency of the shearing resistance is higher between the first rotor 8 and the second rotor 10 as described above, so that the braking torque is increased between the inner periphery of the first rotor 8 and the outer periphery of the second rotor 10, and also the braking torque caused by the inner periphery of the insertion 22 of the second rotor 10 is increased. Accordingly, when the above increased braking torques are added together, the braking force acting on the first rotor 8 is further increased.

The first embodiment has a high speed dependency as described above, but by varying the gear ratio between the ring gear 25 on the first rotor 8 and the sun gear 21 on the second rotor 10, the magnitude of the speed dependency can be varied. Specifically, when a further increased braking torque is required, the gear ratio between the ring gear 25 and the sun gear 21 is increased. By increasing the gear ratio, a rotational speed of the second rotor 10 is increased, thereby increasing the shearing resistance between the first rotor 8 and the second rotor 10, resulting in further increased braking torque.

In contrast to this, when a low braking torque is required, it is possible to reduce the gear ratio between the ring gear 25 and the sun gear 21.

In this way, because the braking torque can be varied by changing a gear ratio between the ring gear 25 on the first rotor 8 and the sun gear 21 on the second rotor 10, it is possible to provide braking torque in accordance with the use.

Further, according to the first embodiment as described above, the shearing resistance is generated only at two points on the jutting strips 17a and 24a. In other words, only the two points affect a magnitude of the braking torque. Hence, only jutting strips 17a and 24a need to undergo assembly control. The reduction in the number of points subject to assembly control decreases assembly error, thus providing the predetermined braking torque. Accordingly, it is possible to prevent variations in braking torque such as the prior art produces, and reliably provide the torque assumed in the design.

Still further, the prior art needs the use of a plurality of disks, leading to an increase in size of the entire damper. However, the first embodiment provides high braking torque with a reduced number of points generating shearing resistance as described above, thereby achieving a reduction in size of the entire damper.

In the first embodiment, on the faces 16b and 16c of the ring-shaped installing recess 16 formed on the first rotor 8, and on the rising portion 10a of the second rotor 10 facing the face 16c, a jutting strip is not provided in proximity to the faces 16b, 16c or the rising portion 10a. Therefore, the shearing resistance on the faces 16b, 16c and portion 10b is lower than that on the faces provided with the jutting strips 17a and 24a. However, a jutting strip can equally be formed on the face 16b, 16c or rising portion 10a. If the jutting strip is formed on the face 16b, 16c or rising portion 10a, a larger shearing resistance can be generated thereon.

The rotational speed controller as described above can be used for a sliding door and the like as well as for the roller blind. In the case of the use of the rotational speed controller for the sliding door, the sliding door is prevented from closing sharply. In this way, the aforementioned rotational speed controller is used for the purpose of braking a rotational speed of a shaft, and the use thereof is not limited to the roller blind.

Figure 5:
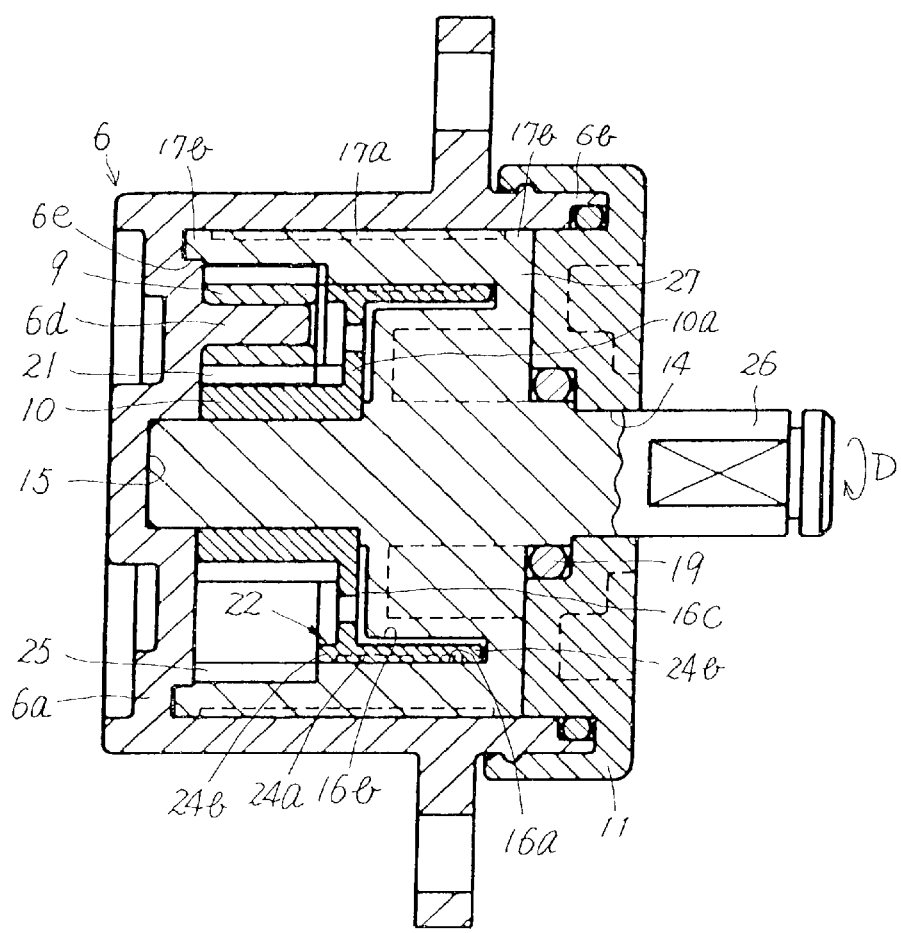
FIG. 5 is a sectional view of a second embodiment of an endless rotation damper.

FIG. 5 is a sectional view for illustrating a second embodiment.

The second embodiment has the most striking feature that a shaft 26 is combined with a first rotor 27, and except for the feature the second embodiment has a similar construction to that in the first embodiment. Therefore in the second embodiment, the same components as those in the first embodiment are indicated by the same reference numerals as those in the first embodiment and the detailed description is omitted.

In the second embodiment, a one-way clutch is not interposed between the shaft 26 and the first rotor 27. In other words, the shaft 26 and the first rotor 27 are associated directly with each other and formed combinedly. Accordingly, when the shaft 26 is rotated in either of the direction indicated by the arrow D in FIG. 5 or the opposite direction, the rotating force of the shaft 26 is transferred to the first rotor 27. When the damper designed in this way is used in the roller blind, braking torque is produced when the blind is wound up and down.

Besides the above advantage, the second embodiment has the advantages and the like such as in the first embodiment.

Figure 6:
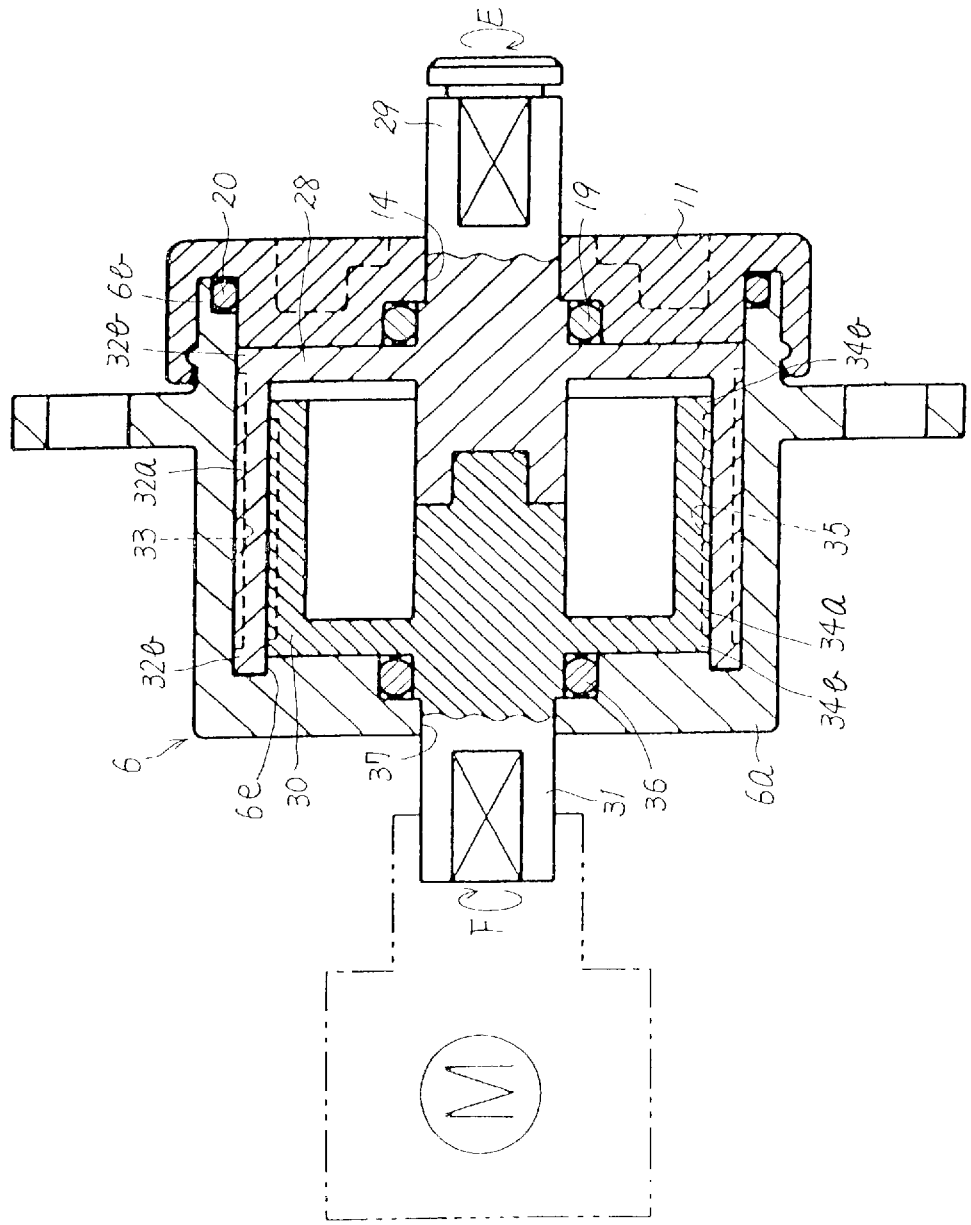
FIG. 6 is a sectional view of a third embodiment of an endless rotation damper.
Figure 7:
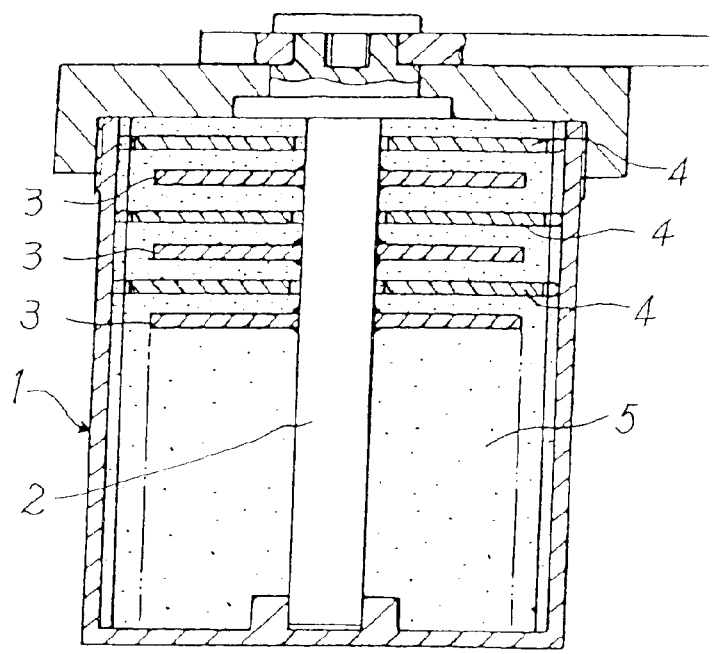
FIG. 7 is a sectional view of an example of conventional endless rotation dampers.

FIG. 6 is a sectional view illustrating a third embodiment. In the third embodiment, a first rotor 28 is combined with a first shaft 29. A bearing hole 37 for supporting a second shaft 31 is formed in the closed end wall 6a of the casing 6. The second shaft 31 is combined with a second rotor 30. The axis of the first shaft 29 is in line with that of the second shaft 31. The first and second shafts 29 and 31 are relatively rotatably connected.

A sealer 19 seals the interface between the first shaft 29 and the cap 11. A sealer 20 seals the interface between the cap 11 and the casing 6. A sealer 36 seals the interface between the second shaft 31 and the casing 6.

In the third embodiment, the second shaft 31 is rotated by a motor M. Accordingly, a first rotation mechanism for rotating the first rotor 28 is the first shaft 29. A second rotation mechanism for rotating the second rotor 30 is the second shaft 31 rotated by the motor M.

As in the case of the first embodiment, the first rotor 28 has the outer periphery on which a plurality of fluid storing recesses 33 is formed by means of enclosure by jutting strips 32a extending in parallel to the axis thereof and circumferential protrusions 32b extending in the circumferential direction. The first rotor 28 designed as described above is incorporated in the casing 6 such that the jutting strips 32a and the circumferential protrusions 32b are in close proximity to the inner periphery of the casing 6 and slide thereon.

Likewise, the second rotor 30 has a plurality of fluid storing recesses 35 formed thereon by means of enclosure by jutting strips 34a and circumferential protrusions 34b. The second rotor 30 is incorporated in the inside of the first rotor 28 such that the jutting strips 34a and the circumferential protrusions 34b are in close proximity to the inner periphery of the first rotor 28 and slide thereon.

The other construction in the third embodiment is the same as or similar to that in the first embodiment, so that the same reference numerals used in the first embodiment are used and the detailed description is omitted.

In the construction as described above, the first shaft 29 is rotated in the direction indicated by the arrow E in FIG. 6, and the second shaft 31 is rotated in the direction indicated by the arrow F which is opposite to the direction of the arrow E. The first shaft 29 and the second shaft 31 are rotated in the opposite directions to each other, so that the first rotor 28 and the second rotor 30 are also rotated in the opposite directions to each other.

Upon the rotation of the first rotor 28 and the second rotor 30 in the opposite directions, the oil in the fluid storing recesses 35 generates a high shearing resistance. The magnitude of the shearing resistance is dependent upon the rotational speed of the first shaft 29 and the second shaft 31. For this reason, it is possible to increase the shearing resistance on the fluid storing recesses 35 by increasing the rotational speed of the first and second shafts 29 and 31 rotated in the opposite directions to each other.

And also, the rotating of the first rotor 28 provides a shearing resistance on the fluid storing recesses 33.

Hence, the shearing resistance in the entire damper is equal to the sum of the shearing resistances on the fluid storing recesses 33 and the fluid storing recesses 35, resulting in a further increase of shearing resistance. The increased shearing resistance correspondingly provides an increase of braking torque.

Further, the use of the motor M as a driving source for the second rotation mechanism of rotating the second shaft 31 allows the second shaft 31 to be rotated faster than it is rotated manually. The increase of the rotational speed correspondingly provides an increase of braking torque. Still further, if a motor M is used as a driving source for another mechanism, the motor M can be also used as the driving source for the second rotation mechanism. In other words, the single motor M serving as the driving source can be shared between another mechanism and the second rotation mechanism, leading to cost reduction.

Besides the above advantages, the third embodiment has the advantages and the like such as in the first embodiment.

The third embodiment describes the case of the use of the motor M as the driving source for the second shaft 31, but another form other than the motor M can be used as the driving source for the second shaft 31.

I claim:

1. A rotational speed controller, comprising:

a casing filled with a viscous fluid;

a shaft rotating relatively to said casing;

a first rotor incorporated in said casing;

a second rotor rotating relatively to said first rotor with a gap between itself and the first rotor;

a cap for hermetically sealing said casing;

a first rotation mechanism for rotating said first rotor; and a second rotation mechanism for rotating said second rotor, shearing resistance being generated between said first rotor and said second rotor.

2. A rotational speed controller according to claim 1, wherein a gap is maintained between the inner periphery of said casing and the outer periphery of said first rotor, and shearing resistance is generated between the inner periphery of the casing and the outer periphery of the first rotor.

3. A rotational speed controller according to claim 1, wherein said first rotor and said second rotor are rotated in the opposite directions to each other.

4. A rotational speed controller according to claim 1, wherein said first rotor and said second rotor are rotated relatively by a planetary gear mechanism.

5. A rotational speed controller according to claim 1, wherein said first rotor and said second rotor are driven by a same driving source.

6. A rotational speed controller according to claim 1, wherein said first rotor and said second rotor are driven individually by separate driving sources.

* * * * *